J. SPIESS.
TRAIN CONTROLLING MECHANISM.
APPLICATION FILED JAN. 22, 1916.
1,252,047.
Patented Jan. 1, 1918.
9 SHEETS—SHEET 8.
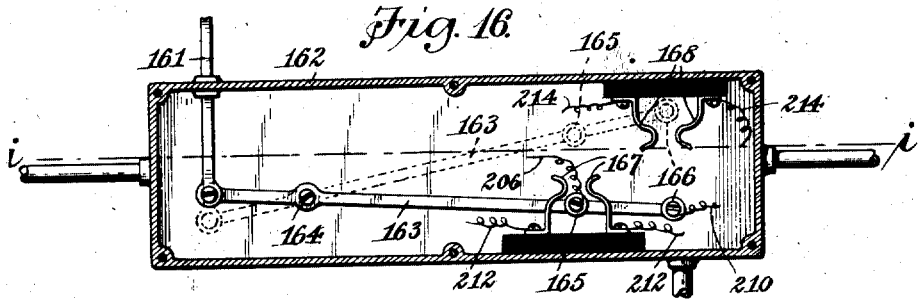
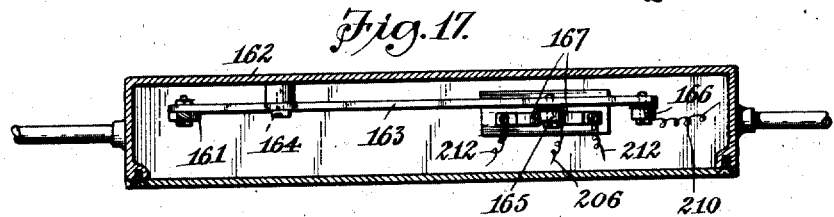
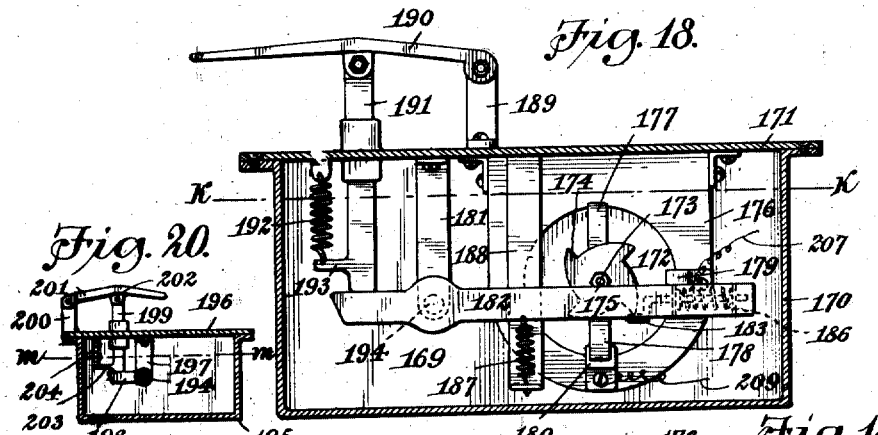
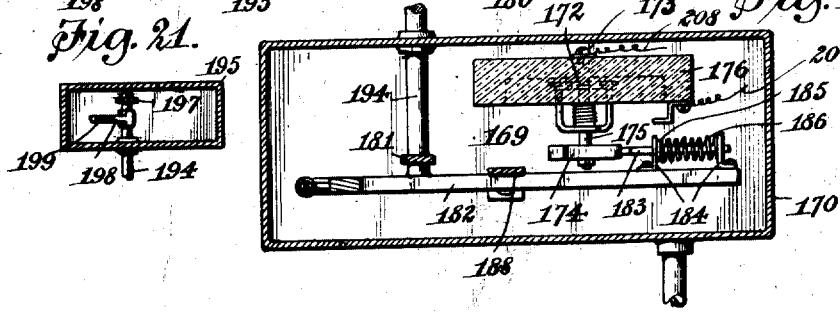
Witness:
Jacob Obrist, Jr.
Jules Spiess, Inventor
By Emil Kerbach
Attorney.

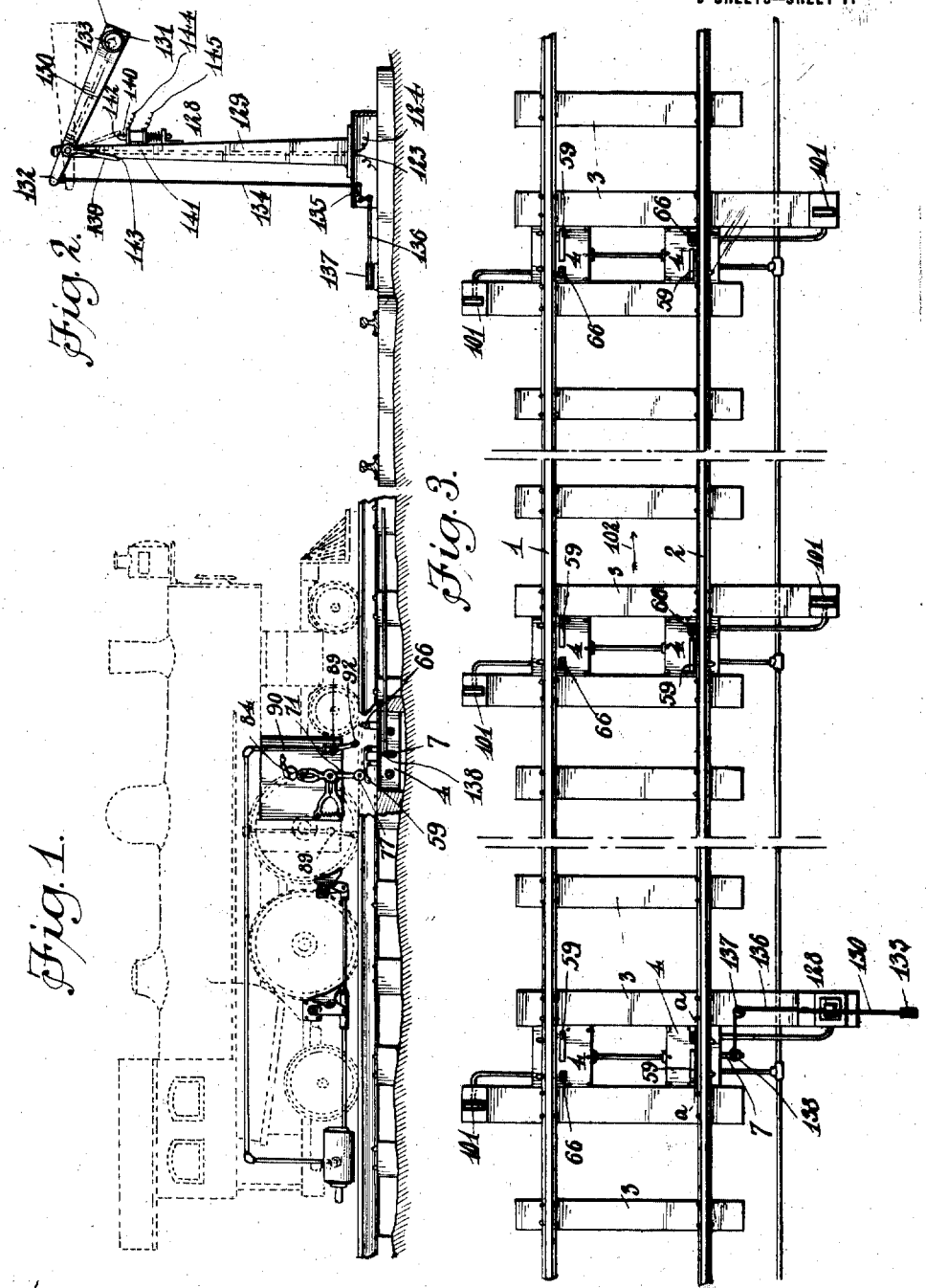

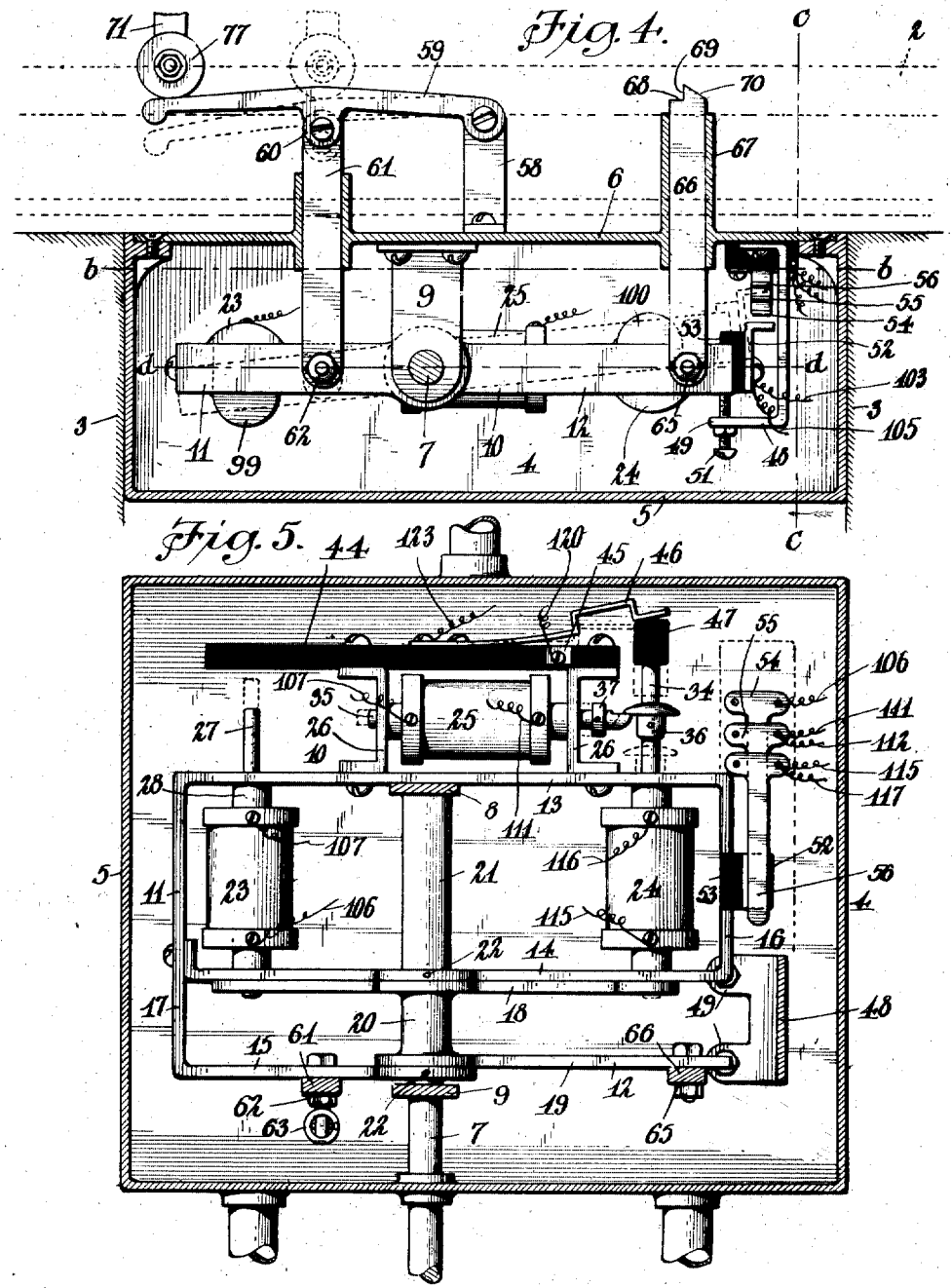

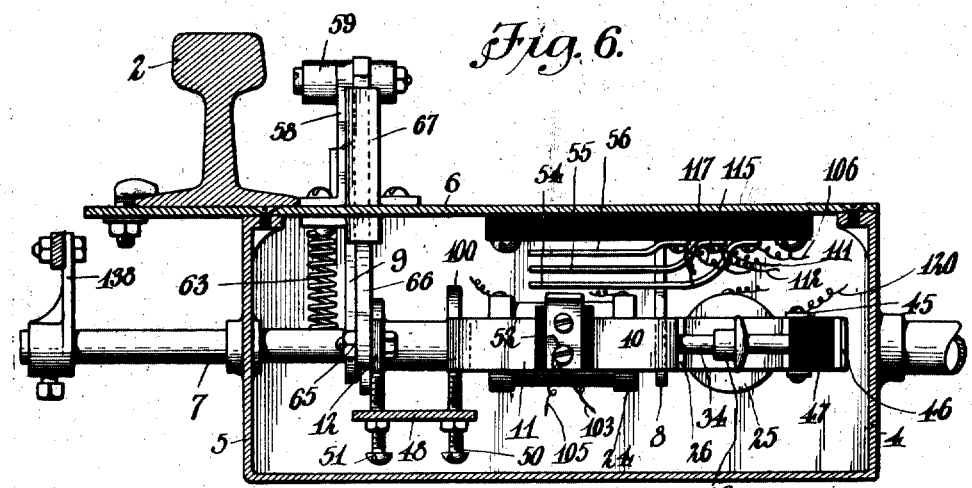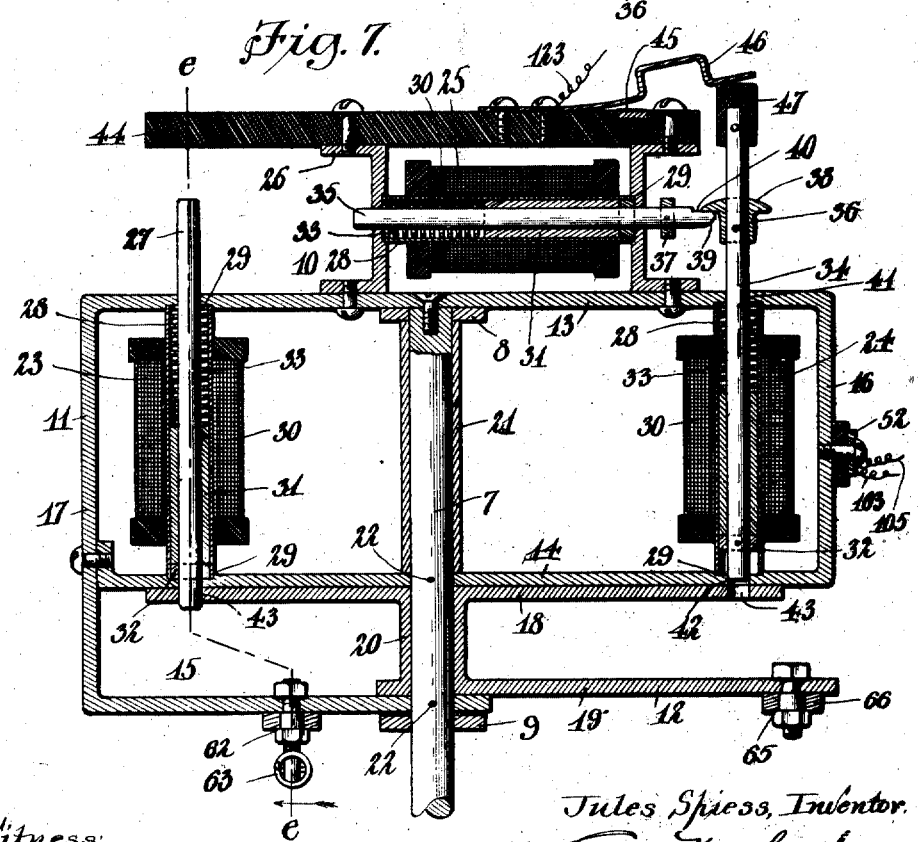

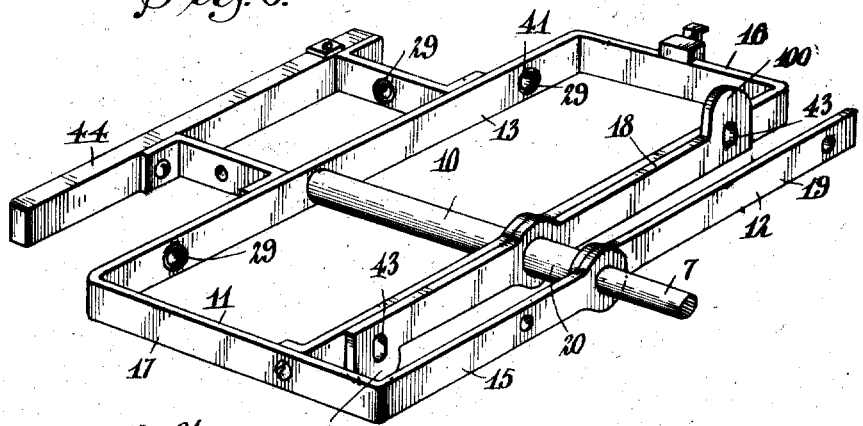
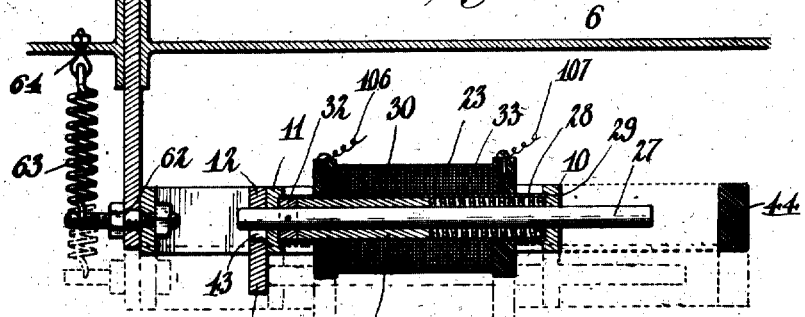
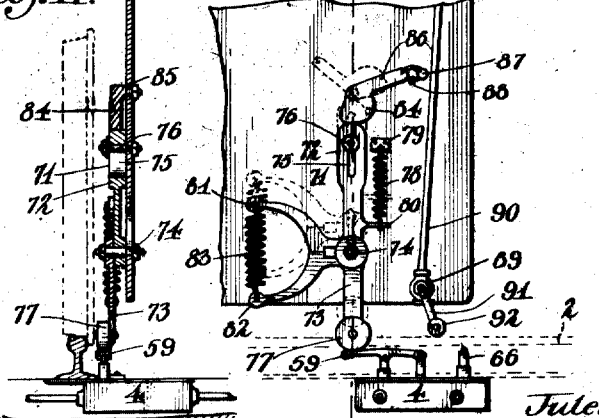

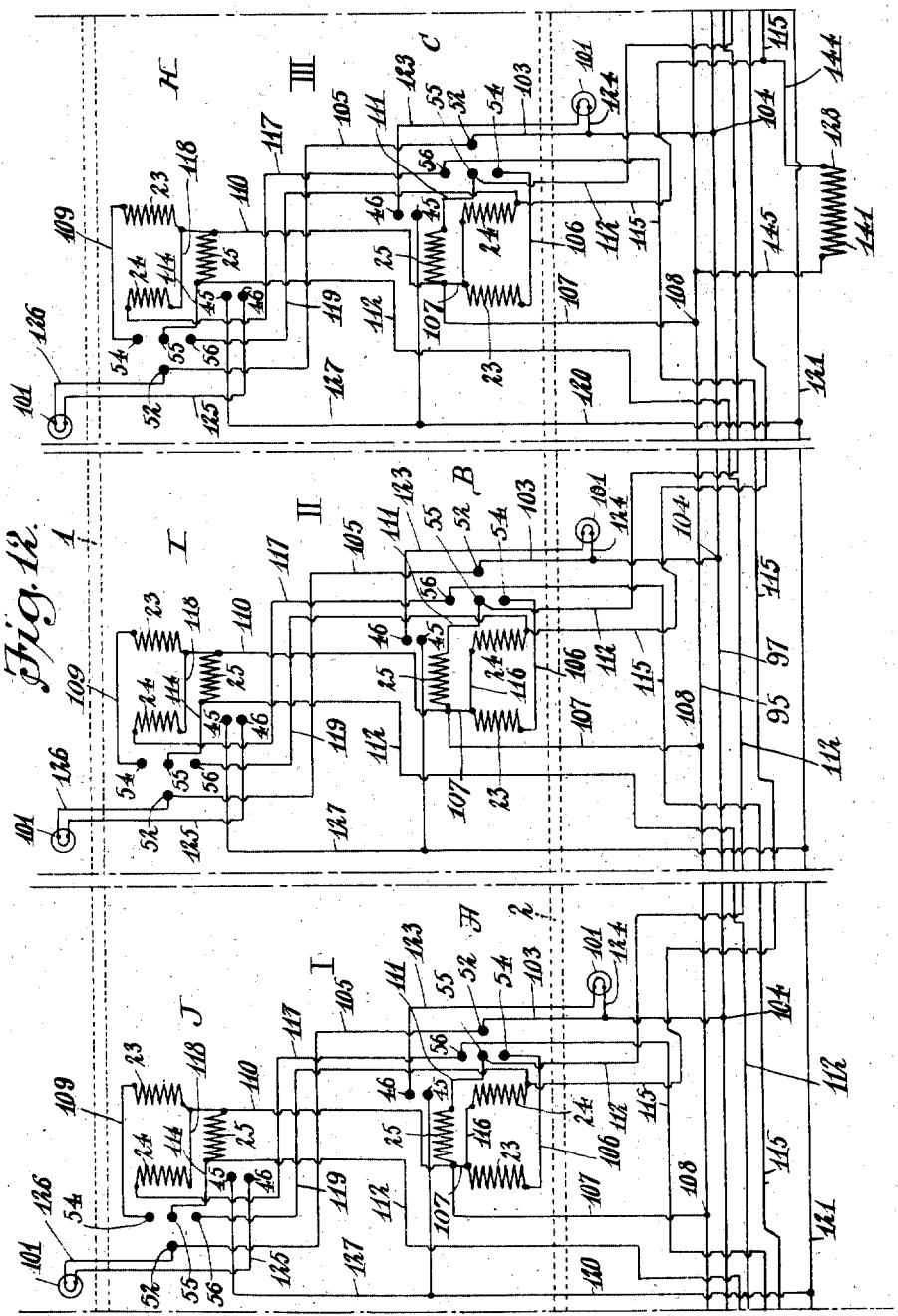

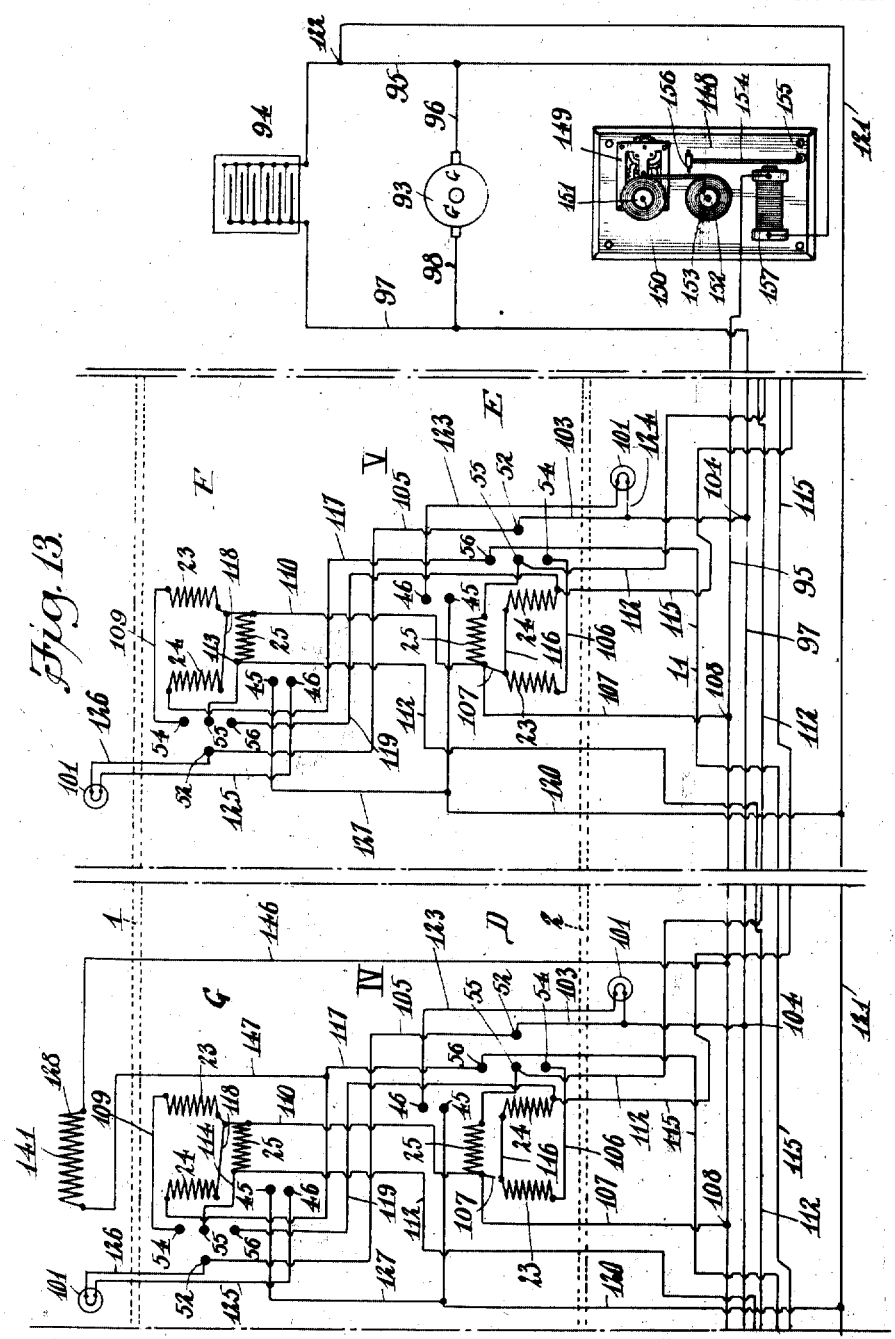

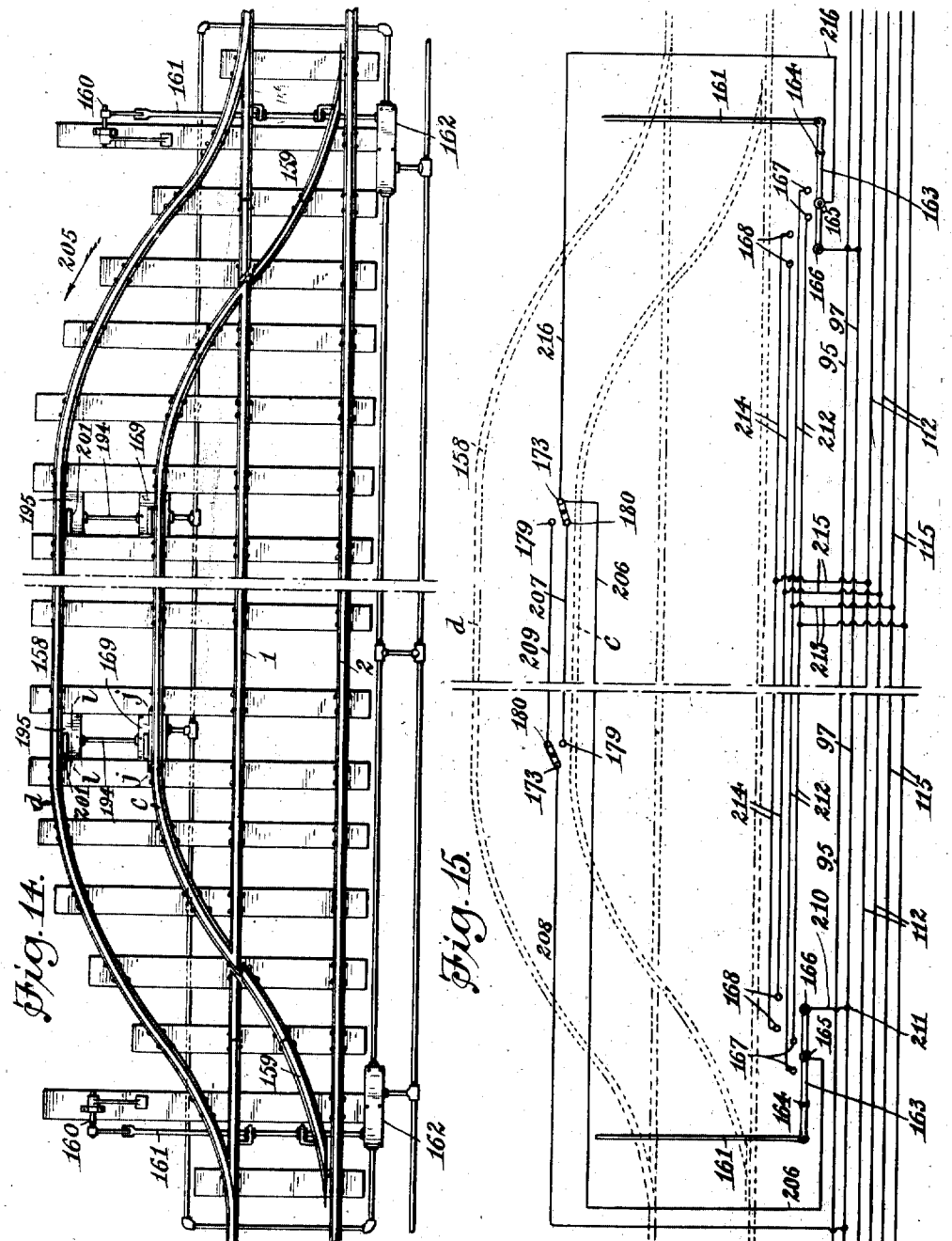

J. SPIESS.
TRAIN CONTROLLING MECHANISM.
APPLICATION FILED JAN. 22, 1916.
1,252,047.
Patented Jan. 1, 1918.
9 SHEETS—SHEET 9.
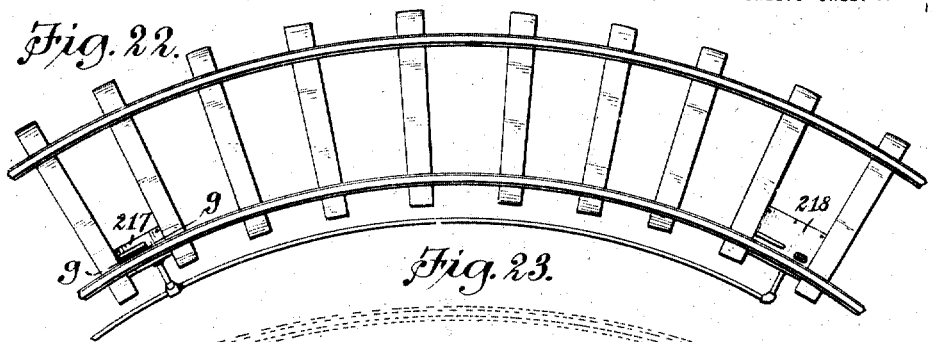
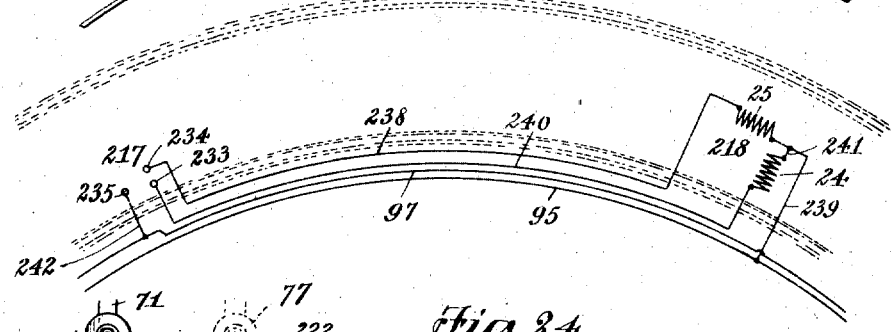
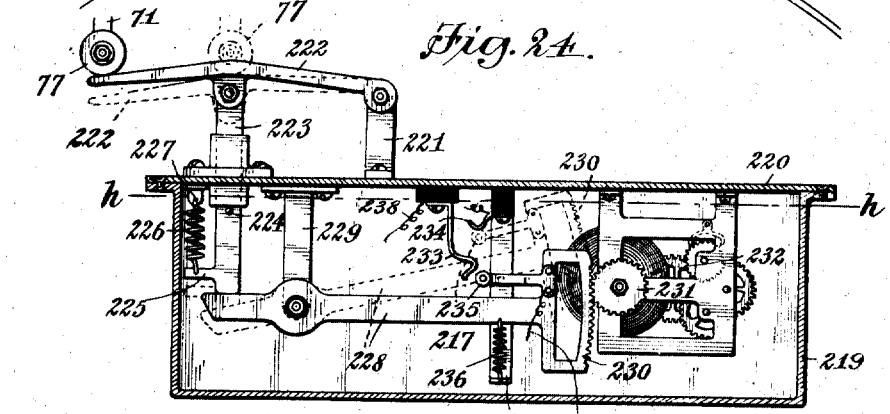
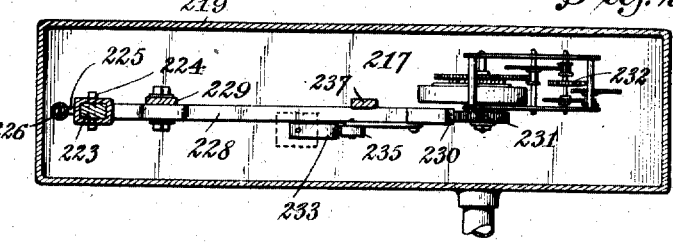
Witness:
Jacob Oberst, Jr.
Jules Spiess, Inventor.
By Emil Kenhart
Attorney

UNITED STATES PATENT OFFICE.

JULES SPIESS, OF BUFFALO, NEW YORK.

TRAIN-CONTROLLING MECHANISM.

1,252,047. Specification of Letters Patent. Patented Jan. 1, 1918.

Application filed January 22, 1916. Serial No. 73,623.

*To all whom it may concern:*

Be it known that I, JULES SPIESS, a subject of the Emperor of Germany, residing at Buffalo, in the county of Erie and State of New York, have invented certain new and useful Improvements in Train-Controlling Mechanism, of which the following is a specification.

My invention relates to improvements in train controlling apparatus, and more particularly to controlling apparatus to prevent trains on single track railroads from colliding while traveling in the same or in opposite directions; or to prevent rear end collisions on double tracks between trains traveling on the same track in like direction.

The primary objects of my invention are the provision of novel apparatus having coöperating parts arranged along the rails of a single track to prevent trains colliding while traveling in the same or in opposite directions; to control the speed of trains in passing over curved portions of a track; to prevent collision at sidings; and to record the speed of trains and their locations along the track.

It also has for its object the provision of electrically-controlled devices whereby a locomotive or train is caused to stop when another locomotive or train ahead is traveling in the same or opposite direction within a certain distance, herein defined as a section or sections.

It also has for its object the provision of electrically-controlled devices at different points along a track or tracks which are electrically connected in groups, and to equip locomotives or trains traveling on the track or tracks with coöperating means which serve to cause the locomotive or train to which it is attached to stop when another locomotive or train is on the track ahead within a certain distance.

It also has for its object to provide electrically-controlled devices whereby a locomotive or train is caused to stop when another locomotive or train ahead traveling in the same or in an opposite direction is within a certain distance, and also to cause a locomotive or train following to stop at a certain distance in rear to prevent a rear end collision.

A further object is to provide stop mechanism at the track adapted to be actuated by a locomotive or train at a distant point therefrom, and to equip locomotives or trains with brake controlling means accessible to the engineer from the ground only and adapted to be actuated by said stop mechanism to cause the locomotive or train to stop when another locomotive or train ahead is on the track within a certain distance, said brake controlling mechanism being so arranged that when actuated it cannot be returned to normal position except by manual manipulation, which requires the engineer to leave the locomotive cab and reset the controlling means from a position on the ground.

A further object is to provide stop mechanism at different points along a single track and at opposite sides thereof and equip locomotives with stop actuating and brake controlling means at opposite sides thereof, one stop actuating and brake controlling means being adapted for co-action with the stop mechanism at one side of the track when traveling in one direction and the other for co-action with the stop mechanisms at the other side of the track, said mechanisms being arranged in groups and each forming part of a plurality of groups, each stop mechanism being operatively connected with the remaining mechanisms of all the groups which it forms part of.

A further object is to provide electrically-controlled stop mechanisms at certain points along the track and to equip each of said mechanisms with a trip device adapted for co-action with brake controlling-means on a train or locomotive to set the brakes thereof.

It further has for its object to provide electrically-controlled stop mechanisms at spaced points along the track and equip the same with a safety device to assure proper actuation of the stop mechanism even though the electric current may be broken.

Still further objects are to provide a train controlling apparatus having means to indicate the location of trains traveling within a certain predetermined length of trackage; to provide means for controlling the movements of trains in passing over a portion of a track provided with a siding and in passing over the siding, or onto and from the siding.

With these and other objects in view, my invention consists, generally stated, in suitably controlled mechanisms arranged at intervals along a track, to stop a train when another traveling in the same or in an opposite direction is ahead on the track within certain limits, to stop a train in rear when it has reached a certain predetermined distance from another ahead or when the train ahead is stopped by any of said mechanisms; said mechanisms being grouped and each forming part of several groups.

It further consists in the novel arrangement of mechanisms and devices, and in the combination and construction of parts to be hereinafter described and more particularly pointed out in the subjoined claims.

In the drawings,—

Figure 1 is a side view of a track with parts broken away and a locomotive thereon mainly shown in dotted lines, only such parts of the locomotive directly associated with the mechanism at the track being shown in full lines.

Fig. 2 is a cross section of a track showing a semaphore associated therewith and its movement in one direction controlled by mechanism at the track forming part of this invention.

Fig. 3 is a plan view of a track showing spaced stop mechanisms in connection therewith, the spaces between said mechanism being shortened, portions omitted being indicated by transverse broken lines.

Fig. 4 is an enlarged vertical longitudinal section of one of the stop mechanisms taken on line a—a, Fig. 3.

Fig. 5 is a horizontal section taken on line b—b, Fig. 4.

Fig. 6 is a transverse section taken on line c—c, Fig. 4, looking in the direction of the arrow crossing said line.

Fig. 7 is an enlarged horizontal section taken on line d—d, Fig. 4.

Fig. 8 is a detached perspective view of the tilting frame of one of the stop mechanisms which carries certain operating parts of the mechanism.

Fig. 9 is a transverse section taken on line e—e, Fig. 7, looking in the direction of the arrow crossing said line.

Fig. 10 is a side elevation of a portion of a locomotive and one of the stop mechanisms arranged at intervals along the track.

Fig. 11 is a vertical section taken on line f—f, Fig. 10, looking in the direction of the arrow crossing said line.

Fig. 12 is a diagrammatic view of the electric circuit wires arranged along the track and between three adjoining stop mechanisms at each side of the track.

Fig. 13 is a diagrammatic view of the electric circuit wires arranged along the track and between the two adjoining stop mechanisms at each side of the track arranged in succession at the right of those indicated in Fig. 12 also showing means to indicate and record the location of trains in the track sections and the points along said sections at which they may have been stopped.

Fig. 14 is a plan view of a portion of a track provided with a siding.

Fig. 15 is a diagrammatic view of the same showing the electric circuit wires between the different mechanisms controlling the movement of trains into, from, and over the siding, and also along the main track at the siding.

Fig. 16 is an enlarged horizontal section of one of the siding controlling devices shown in Fig. 14.

Fig. 17 is a vertical section taken on line i—i, Fig. 16, the device being inverted.

Fig. 18 is an enlarged horizontal section through one of the stop mechanisms of the siding taken on line j—j, Fig. 14.

Fig. 19 is a horizontal section taken on line k—k, Fig. 18.

Fig. 20 is an enlarged section through one of the auxiliary stop mechanisms, taken on line l—l, Fig. 14.

Fig. 21 is a horizontal section taken on line m—m, Fig. 20.

Fig. 22 is a plan view of a curved portion of the track provided with a stop mechanism adapted to actuate the brake controlling means of a locomotive or train when passing over the track at a greater speed than the rules permit, and a time-governed controlling mechanism to actuate or set said stop mechanism.

Fig. 23 is a diagrammatic view of the electric circuit wires connecting the operating parts of the controlling and stop mechanisms of a curved track.

Fig. 24 is an enlarged vertical section of the time-governed controlling mechanism, taken on line g—g, Fig. 22.

Fig. 25 is a horizontal section taken on line h—h, Fig. 24.

A description of the preferred construction of my invention follows, although my invention may be otherwise constructed without departing from the principle involved.

The reference numerals 1, 2 designate the two rails of a single track secured in the usual manner to the cross ties 3 embedded within the road-bed. The track is divided into sections which may be of any desired length, and for convenience in describing my invention I have illustrated in Figs. 12 and 13 five sections numbered in succession I, II, III, IV, V, respectively. In each section at directly opposite points I arrange electrically-controlled devices or mechanisms 4, and adjoining sections of the track may be said to meet at any point between the devices or mechanisms of said sections.

Each device or mechanism 4 comprises a box-like structure or casing 5 having its top wall 6 removable therefrom for conveniently gaining access to the interior. A rock-shaft 7 is journaled in one of the side walls of the casing and also in brackets 8, 9 secured to the removable top 6 and depending therefrom. Secured to said shaft is a carrying frame 10 which is constructed in two parts 11, 12, and for convenience in describing the invention I have termed one of said parts the main frame for the reason that it supports most of the operating parts of the mechanism and also for the reason that it is often operated when the other part is held against operation, and said other part I have termed the secondary or trip frame.

These carrying frames may be constructed in any practicable manner, but in the drawings I have shown them formed of metal bars, the main frame 11 having the longitudinal bars 13, 14 and 15, the end bar 16 connecting the longitudinal bars 13, 14 at one end and the end bar 17 connecting the longitudinal bars 13, 14 and 15 at their other ends, the longitudinal bar 15 being somewhat shorter than the bars 13 and 14.

Each secondary or trip frame 12 comprises two longitudinally-disposed bars 18, 19 which are connected by a sleeve 20 through which the shaft 7 is passed. The bar 19 extends from the sleeve 20 in one direction while the bar 18 extends from the sleeve 20 in opposite directions.

A spacing sleeve 21 surrounds the shaft 7 of each mechanism and abuts at one end against the brackets 8, and at its other end against the longitudinal bar 14 of the main frame. The secondary or trip frame 12 is loosely mounted on the shaft 7 so that the latter may rotate independent of said frame and so that said frame may tilt without movement of said shaft. Although the main frame may be secured to the rock-shaft 7 in any practicable manner I have, however, provided pins 22 which are passed through the bars 14, 15 and through said shaft, as best shown in Figs. 5 and 7.

I have provided three solenoids 23, 24, 25 for each carrying frame, the spools of the solenoids 23, 24 being arranged between the bars 13, 14 of the main frame 11 while the solenoid 25 is carried by a pair of spaced brackets 26 secured to the bar 13 of the main frame. The solenoid 23 has a pin 27 which normally extends through the spool thereof and through alined openings in the bars 13, 14 of the main frame and the bar 18 of the secondary or trip frame, thereby locking said secondary or trip frame to the main frame and compelling the secondary or trip frame to tilt with the main frame when the latter is caused to tilt. This solenoid I have termed the "safety" solenoid for the reason that when demagnetized it locks the secondary frame to the main frame.

Each safety solenoid comprises a metallic sleeve 28 having its ends embedded in depressions 29 in the bars 13, 14 of the main frame, and mounted on said sleeve is the usual coil of wire 30 through which an electric current is adapted to be passed to cause actuation of the pin 27, which for convenience I term a "safety" pin. This safety pin is slidable within a bushing 31 held within said sleeve and it has a collar 32 secured thereto which normally bears against the bar 14 of the main frame. A spiral spring 33 is located within the sleeve 28 and surrounds the pin 27, one end of said spring bearing against the longitudinal bar 13 of the main frame and its other end against the bushing 31, tending to move said bushing, the collar 32 against which it bears and the safety pin to which said collar is secured in one direction so as to lock the secondary or trip frame to the main frame and retain said pin in locked position until current is passed through the solenoid and energizes the same to cause reverse action of the pin against the action of the spring 33.

The solenoids 24 and 25 are similarly constructed, the solenoid 24 being termed an "unlocking" solenoid and having an "unlocking" pin 34 which normally is held against the action of the spring surrounding it after being magnetically attracted by reason of an electric current being passed through the solenoid. The pin of this solenoid is adapted to be retained in energized or retracted position by the solenoid 25 which I term the "locking" solenoid, and for this purpose the pin 35 of said last-mentioned solenoid engages a flanged collar 36 on said unlocking pin, and owing to the pin 35 of the locking solenoid acting to lock the unlocking pin in retracted or energized position I term said pin 35 a "locking" pin. The locking pin 35 is normally held in locking position by the spring of the solenoid surrounding it and when said locking solenoid is energized, said locking pin is attracted and drawn away from the flanged collar 36 of the unlocking pin. The locking pin 35 is provided with a stop collar 37 which is adapted to engage the adjacent bracket 26 and limit the movement of said pin away from the collar 36.

It is to be noted that the outer end of the collar of the unlocking pins of each mechanism 36 is made convex, as at 38, and that the adjacent end of the locking pin 35 is rounded, as at 39, so that when the locking solenoid is demagnetized, the spring of said solenoid forces the locking pin 35 toward the unlocking pin. The rounded end 39 of said locking pin is presented to the convex outer face of the flanged collar 36; consequently, when the unlocking pin is attracted by reason of the unlocking solenoid being energized, the convex face 38 of the flanged collar 36 engages the rounded end 39 of the locking pin and forces the latter inwardly against the action of its co-acting spring until the flanged portion of collar 36 passes the cut-away portion 40 of the locking pin, which cut-away portion is provided to present a flat bearing face for contact with the flat side of the flange or collar 36.

With the parts in normal position, the locking pin 27 locks the secondary or trip frame 12 and main frame 11 together, and the unlocking pin 34 is retracted and held in retracted position by the locking pin 35. The unlocking pin 34 is slidable in the spool of the solenoid of which it forms part and in openings 41, 42 formed respectively in the longitudinal bars 13, 14 of the main frame and it is adapted when released by the locking pin 35 to be passed into an opening 43 formed in the secondary or tilting frame 12.

The locking pin 35 of each mechanism is slidable in the spool of the solenoid of which it forms part and in alined openings in the brackets 26. The brackets 26 are connected at their outer ends by a bar 44 formed of insulating material having a fixed contact 45 fitted thereinto and slightly projecting therefrom, and a flexible contact 46 which is adapted to be engaged by a head 47 of insulating material pinned or otherwise secured to the adjacent end of the unlocking pin 34. With the parts in normal position the flexible contact 46 is flexed outwardly by the head 47 of the unlocking pin so that it is held disengaged from the fixed contact 45.

48 designates a bracket which is secured to the removable top 6 of the casing near one end thereof and extends downwardly therefrom, said bracket having a pair of laterally-disposed ears 49 through which adjusting stop screws 50, 51 are passed. The screw 50 engages the adjacent end of the main frame while the screw 51 engages the end of the secondary or trip frame, thus limiting the downward movement of the complete or carrying frame at said end and preventing upward movement of the frame at the opposite end, this reverse movement of opposite ends of the frame being due to the fact that the frame is pivotally mounted between its ends, and preferably nearer one end than the other.

At that end of the main frame at which the unlocking solenoid is located it is provided with a contact 52 which is insulated from said frame by insulation material 53, and situated directly above said contact are three flexible leaf contacts 54, 55, 56 in superposed and spaced arrangement, said flexible contacts being secured to a block of insulating material 57 fastened to the underside of the removable top 6.

The flexible contact 54 is adapted to be engaged by the contact 52 on the main frame when the latter is tilted, such engagement being caused during the initial tilting movement of said frame. During the further tilting movement of the frame the flexible contact 54 is brought into contact with the flexible contact 55 while retaining contact with contacts 52 and during the final portion of the tilting movement of said frame the flexible contact 55 is brought into engagement with the flexible contact 56 while in engagement with the contact 54 and while contact 54 is in engagement with the contact 52. Electrical connection is therefore made between contact 52 and contact 55 through the medium of contact 54 and between contacts 52 and 56 through the medium of contacts 54 and 55.

Upon the return movement of the frame, contact 55 is first disengaged from the contact 56, after which contact 54 becomes disengaged from contact 55, and the contact 52 finally becomes disengaged from the contact 54 when the frame approaches the end of its return movement.

Rising from the removable top 6 of the casing is a standard 58, to the upper end of which is pivotally secured one end of a pedal or depressor lever 59 which is inclined from opposite ends to its central point, at which point it has its highest elevation. This pedal or depressor lever may be considered the actuator or actuating element of the mechanism and it has a pair of depending lugs 60 at a point between its ends between which is pivotally secured the upper end of a thrust or presser bar 61 which extends down through the removable top 6 of the casing and is pivotally connected to the bar 15 of the main frame, as at 62. This thrust or presser bar has its pivot extending outwardly therefrom and secured thereto is the lower end of a powerful retractile spring 63, the upper end of which is secured to the underside of the removable top 6, as at 64. Spring 63 is of such power that it prevents depression of the actuator, except when extreme weight or power is applied, such as a locomotive has; consequently manual manipulation is guarded against.

Pivotally secured to the secondary frame at 65 is a trip or stop bar 66 which extends upwardly through a guide extension 67 formed on the removable top 6, the upper end thereof extending normally above said extension and having a cut-away portion 68 which forms an abrupt contact 69, and from the extreme upper point of said contact face said bar is inclined downwardly, as at 70, for a purpose to appear hereinafter.

In connection with the mechanism arranged at intervals along the track, the locomotives or trains passing along the track are equipped with brake controlling or stop actuating means, such means being intended for attachment to the sides of a locomotive, but it is to be understood that such means may be applied to other portions of a train or to a motor or other car traveling on the track.

As there is a device or mechanism arranged at each side of the track within each section, one to control the movements of trains traveling in one direction and the other to control those traveling in the opposite direction, the locomotive or train is equipped with brake controlling or stop actuating devices at each side so that it may be moved in either direction and properly actuate the mechanisms provided for controlling the movements of trains. Each of these stop actuating devices comprises a vertically-disposed actuating rod 71 formed in two sections 72, 73, pivotally connected together, as at 74. The upper section 72 is provided with a vertical slot 75 through which a bolt 76 projecting from the locomotive or train is passed, and the lower end of the lower section 73 is provided with a roller 77 adapted to engage and depress the actuating element 59 and actuate the stop mechanism for setting a stop mechanism or mechanisms at a certain point or points ahead and releasing a stop mechanism previously set at a certain distance in rear of the train, and if desired, the stop mechanism, directly opposite.

The actuating rod 71 is retained on the locomotive in any suitable manner and held elevated against an abutment by means of a retractile spring 78 fastened at one end to a bracket 79 secured to the locomotive and at its other end to an arm 80 extending from the upper section 72 of said actuating rod. At the lower end of said upper section 72 a rearwardly-directed and upwardly curved arm 81 is formed, and the lower section 73 is provided at its upper end with a similar arm 82, reversely arranged. Between the extremities of these arms a retractile spring 83 is arranged having opposite ends secured to the outer ends of said arm, thus serving to retain the upper and lower sections of the actuating bar in alinement.

The abutment provided to retain the actuating rod in lowered position is shown in the form of a cam 84 pivoted, as at 85, and having a handle 86 extending therefrom. A wire seal 88 is passed through the handle 86 and through a stud 87 projecting from the side of the locomotive.

When for any reason it is desired to prevent the actuating rod operating the stop mechanisms, the seal 88 is broken and the cam 84 swung to the position shown in dotted lines in Fig. 10, which permits the spring 78 to contract and elevate said rod, the rod being guided in its upward movement by the slot 75 formed therein and the bolt 76 passing through said slot. When elevated, the roller 77 at the lower end of the rod assumes the position shown in dotted lines in said figure so that it travels in a plane above that in which any portion of the stop mechanisms are arranged or can be projected.

The locomotive is also provided with an air valve 89 secured to an air pipe 90 having connection with the air brake system of the locomotive or train. Said valve has a depending lever 91 secured thereto, to the outer or lower end of which a roller 92 is rotatably mounted; said valve, lever and roller constituting the brake-controlling means of the locomotive or train.

When the actuating rod 72 is in normal or lowered position with the upper end thereof against the lowered abutment, the roller engages and travels in contact with the pedal or presser bar 59, and under certain conditions to be hereinafter explained, causes the main frame of the stop mechanism to swing independent of the secondary or trip frame, or with the latter. At such times that the secondary or trip frame is swung or tilted the trip or stop bar 66 attached to said secondary frame is elevated and as said bar is attached to the long side of the frame, its movement is greater than that of the thrust or presser bar 61, which is connected to the short side of the frame. When a locomotive travels over a mechanism having a trip bar elevated, the lever 85 of the air valve on said locomotive comes in contact with the elevated trip or stop bar and opens the valve 89 to the desired extent, thus permitting the escape of air from the air brake system and causing the wheels of the locomotive and those of the cars attached thereto to be engaged by their respective brakes, thus stopping the train.

Proceeding now to describe the circuit wires electrically connecting the stop mechanisms or devices arranged along the track, I will designate the mechanisms or devices shown in the five sections of Figs. 12 and 13 by letters. The mechanisms or devices arranged adjacent the rail 2 of the track are successively designated by the letters A, B, C, D and E commencing at the left, and those arranged along the rail 1 of the track by the letters F, G, H, I and J commencing at the right. As thus arranged the mechanism or device A is opposite that designated J, B opposite I, C opposite H, D opposite G, and E opposite F.

It is intended where the track is of great length that the current will be supplied to the circuit wires at different points along the track, say for example, every fifty miles, and the sections into which the track is divided may be two miles in length so that the mechanisms or devices in each section are spaced two miles from those of adjoining sections. Of course, these sections may be shorter or longer if desired, and the source of power may be applied to the circuit wires at closer intervals or at greater intervals, or if possible at one point along the track.

In the drawings, in Fig. 13 I have shown a generator 93 and a storage battery 94. Leading from the negative pole of the battery 94 is a circuit wire 95 to which a wire 96 leading from the negative pole of the dynamo is attached. Leading from the positive pole of the storage battery 94 is a circuit wire 97 to which a wire 98 leading from the positive pole of the dynamo is attached. The positive and negative wires 95, 97 extend along the track from this source of supply to the point near that at which another battery or source of electric supply is located, and if the battery 94 is the only source of supply for the full length of the track, the positive and negative wires extend the full length of the road or track.

The generator 93 supplies the storage battery with the necessary current, but it is to be understood that any other arrangement for providing the current may be substituted for that herein shown.

The several contacts of the mechanisms or devices arranged along the track, as well as the solenoids, the wires connected to the solenoids and to said contacts are diagrammatically shown in Figs. 12 and 13, and they are so connected that these mechanisms or devices are arranged in groups so that when a locomotive or train passes over and actuates one of the devices, the device in the second section in rear is actuated or set to show a clear track ahead, while the device two sections ahead at the opposite rail is actuated or set to prevent further movement of a train reaching such point and traveling in an opposite direction. The device or mechanism directly opposite that actuated by the locomotive or train is also actuated or set to indicate a clear track, since it was set by the train when passing over the device or mechanism two sections in rear. The locomotive therefore sets the mechanism two sections ahead at the opposite side of the track against train movement; releases the mechanism on the same side of the track two sections in rear, and also releases the mechanism in the same section at the opposite side of the track.

For convenience of description, the side of the track having the rail 2 I will term the right of the track while that having the rail 1 is to be considered the left of the track. Assuming a locomotive or train to travel in the direction of the arrow 102, Fig. 3, it will for convenience of description be herein considered as traveling to the right, and a train moving in an opposite direction, as traveling to the left.

Each of the contacts 52 at the right of the track is connected by a circuit wire 103 with the positive wire 97, as at 104, and the contacts 52 at the left of the track are connected by circuit wires 105 with the first-mentioned contacts 52. Each of the contacts 54 at the right of the track has a circuit wire 106 leading to the safety solenoid 23 of the same stop mechanism and from said solenoid a wire 107 is led to the negative wire 95 and connected thereto, as at 108, and when any of said contacts 52 at the right of the track is brought into engagement with its co-acting contact 54 a circuit is established from the positive wire 97 through the wire 103; contact 52, 54; wire 106; solenoid 23; wire 107, and the negative wire 95. The contact 54 of each mechanism at the left of the track has connection by a wire 109 with the safety solenoid 23 of the same mechanism, said solenoid having connection by means of a wire 110 with the wire 107 of the mechanism directly opposite; therefore when any one of the contacts 52 at the left of the track is brought into engagement with its coöperating contact 54 a circuit is established from the positive wire 97 through the wire 103, contact 52 at the right of the track having the wire 103 connected thereto, thence through the wire 105 to contact 52 at the left of the track, thence through contact 54, wire 109, solenoid 23 at the left of the track, wire 110 and wire 107 to the negative wire 95.

The contact 52 of any stop mechanism is brought into engagement with its co-acting contact 54 when the actuating rod 71 of a locomotive or train swings the carrying frame of said mechanism, this being effected in a manner to be hereinafter described.

Each of the contacts 55 at the right of the track has a circuit wire 111 leading therefrom to the locking solenoid 25 of the same mechanism, and part of the wire 107 of said mechanism is utilized for establishing the electric circuit through said solenoid, the wire 107 herein shown being employed as a circuit wire for the safety solenoid and the locking solenoid. Each of said contacts 55 also has a circuit wire 112 secured thereto which leads to the locking solenoid at the left of the track two sections to the right, and from said solenoid the wires 110 and 107 are utilized to complete the circuit which is established by making electrical connection between the contacts 55 and 52 in the first-mentioned mechanism.

Each of the contacts 55 at the left of the track has connection with the locking solenoid 25 of the same mechanism by a wire 114, and from said solenoid the wires 110 and 107 are utilized to connect said solenoid with the negative wire 95. Each of the contacts 55 at the left of the track also has connection through the medium of the wires

114 and 112 with the contact 55 and locking solenoid 25 of the second section to the left at the right of the track.

Each of the contacts 56 at the right of the track has a circuit wire 115 connected thereto which leads to the unlocking solenoid 24 at the right of the track in the second section to the left, said unlocking solenoid having a wire 116 connected thereto which leads to the wire 107 attached to the negative wire 95. Each of said contacts 56 also has a wire 117 connected thereto which leads to the unlocking solenoid 24 of the opposite mechanism at the left of the track, said solenoid having a wire 118 connected thereto which leads to the wire 110, said wire 110 having connection with wire 107 leading to the negative wire 95.

Each of the contacts 56 at the left of the track has a wire 119 connected thereto which connects with wire 115 leading to the contact 56 in the second section at the right of the track. From said last-mentioned contact, the wire 117 is utilized, which carries the current through the unlocking solenoid 24 at the left of said section and connection is made from said solenoid to the negative wire 95 by the wires 118, 110 and 107.

Each of the contacts 45 at the right of the track has connected thereto a wire 120 which leads to a second negative feed wire 121 arranged along the track and connected to the negative wire 95, as at 122, Fig. 13. These contacts 45 are adapted to be brought into engagement with contacts 46, each of which latter at the right of the track has a wire 123 connected thereto which leads to a signal lamp 101 of the same mechanism. A wire 124 connects said lamp with the wire 103 leading to the positive wire 97. Each of the contacts 46 at the left of the track has a wire 125 connected thereto which leads to a signal lamp 101 of the same mechanism, the lamp having a wire 126 connected thereto which leads to the contact 52 of the same mechanism. The wires 105, contact 52 in the opposite mechanism at the right of the track, and wire 103 being utilized to connect said contact 52 at the left of the track with the positive wire 97. The contacts 46 are adapted to be brought into contact with the contacts 45 and from each of the latter contacts a wire 127 leads which has connection with the wire 120, said wire 120, as stated, leading to the secondary negative wire 121.

The signal lamps 101 are arranged adjacent the stop mechanisms or devices in an exposed manner and provide a convenient means for informing the engineer as he approaches the stop mechanism adjacent said lamp that he will not be able to proceed beyond said mechanism. Consequently upon approaching the signal he will be able to stop the locomotive or train before reaching the stop mechanism, thus making it unnecessary for him to leave the locomotive cab, and as he will be informed when the track is clear ahead for him to proceed by the light becoming extinguished, he will be free to control the movement of his locomotive or train without being compelled to reset the air valve 89, which remains closed when the train is stopped by the engineer.

I have shown, in two places, provision for a semaphore signal 128 which may be substituted for the signal lamps 101. These semaphores comprise a pole 129, a signaling arm 130 adapted to be moved into either of two positions and retained in such position by its operating connections, the arm 130 being pivoted near one end to the pole so that a long signaling arm 131 is provided and a short actuating arm 132. The long signaling arm may have a lamp 133 at its outer or free end connected by means of the circuit wires 123 and 124 when arranged at one side of the track, and the circuit wires 125 and 126 when arranged at the other side of the track.

In Fig. 2 I have shown the semaphore at the right of the track; consequently the wires shown in this figure are designated 123 and 124. The semaphore arm 130 is directly connected with the rock-shaft 7 of the adjacent stop mechanism and operated thereby and as one means to accomplish this, a rod extends from the arm of said semaphore downwardly to a bell-crank lever 135, said bell-crank lever having a chain or other suitable connection 136 secured thereto which passes around a direction-changing pulley 137 and has connection with an arm 138 secured to the rock-shaft of the mechanism outside of the casing. The position of the semaphore arm indicating a clear track ahead is shown in full lines in Fig. 2, and when said arm is swung upwardly into the position shown in dotted lines, it indicates a train ahead within prohibitive limits; consequently when the secondary or trip frame of the adjacent mechanism is locked to the primary frame the semaphore arm is raised into stopping position, in which position it is locked by an arm 139 engaging the upper end of a locking pin 140 forming part of a solenoid 141 secured to the pole 129. The upper end of said locking pin is beveled, as at 142, and the lower end of the arm 139 is correspondingly beveled, as at 143, so that when said arm is swung inwardly and beyond the pin of said solenoid, the beveled faces engage that of the arm, acting to depress the locking pin against the action of the spring within the spool of the solenoid, in a manner similar to the locking solenoid 25 hereinbefore described.

It is of course understood that after the arm 139 has passed the locking pin, the spring surrounding said pin elevates the latter so that it prevents return movement of said arm, and consequently prevents the lowering of the semaphore arm 130. This solenoid is shown in diagrammatic view to the right of section III, Fig. 12, and to the left of section IV, Fig. 13. These may be used in conjunction with the signal lamps 101 shown in other sections, but preferably are intended to be substituted for said lamps, since said signal lamps serve only as a means of informing an engineer at night whether or not the track is clear ahead; whereas, the semaphore will furnish this information during the day as well as at night.

The solenoid 141, or each of the solenoids 141 when more than one are used, at the right of the track has connection by means of a wire 144 with the unlocking solenoid 24 of the adjacent stop mechanism, and it also has connection by means of a wire 145 with the negative feed wire 95.

The solenoid 141, or each of the solenoids 141 when more than one are used, at the left of the track is connected with the negative feed wire 95 by a wire 146, and it also has connection by means of a wire 147 with the wire 117.

At the point along the track at which the source of current is furnished to the system, a recorder 148 is provided by means of which the location of trains along that stretch of track supplied with current by the battery 94 may be ascertained. This recorder comprises a suitable clock mechanism 149 having a spindle 150 which makes one complete revolution within a predetermined length of time, said spindle having a take-up spool 151 secured thereto. Beneath said spool is arranged a second spool 152, around which a roll of paper 153 in tape form is wound, the paper being unwound from the spool 152 and attached to the spool 151 so that when the spindle 150 rotates it will cause the tape to be wound onto spool 151 and be unwound from the spool 152. This recorder is also provided with a lever 154, pivoted at 155 and having a suitable recording device 156 at its opposite end, which may be a sharp pointed object adapted to penetrate the tape.

In order to actuate said recording lever an electromagnet 157 is provided, which, when energized, attracts the recording lever and causes the penetrating device at its free end to penetrate the paper tape. This electro-magnet is arranged in the negative feed wire 95 so that it actuates whenever a circuit is established through said negative feed wire and the positive feed wire 97.

When the parts of any stop mechanism about to be actuated are in normal position, the safety pin 27 of the safety solenoid of such mechanism locks the main and secondary or trip frame together while the pin 34 of the unlocking solenoid 24 is retracted or withdrawn from the opening in the secondary or trip frame, said pin 34 being retained in retracted position by the locking pin 35 of the coöperating locking solenoid. In order to prevent the secondary or trip frame swinging with the main frame at certain times, the bar 18 of said secondary or trip frame has a depending lug 99 at its left hand end in Fig. 4, and this bar has also an upstanding lug 100 at its right hand end. The openings 43 in the bar 18 are elongated so that when the safety pin 27 and unlocking pin 34 project into said openings, the main frame is permitted to swing through a certain degree without imparting motion to the secondary or trip frame. During the initial portion of the swinging movement of the carrying frame—which the main and secondary or trip frame constitute—an electric current is established which passes through the safety solenoid 23, whereupon the safety pin 27 is retracted from the alined elongated opening 43 in the secondary or trip frame; this retraction of the safety pin being effected before the pin engages the lower end of the elongated opening, thus permitting the main frame to swing independent of the secondary frame. Assuming the stop mechanism actuated to be mechanism C in section III, a further swinging movement of the main frame causes electrical connection to be established between contact 52 and contact 55, of said mechanism, establishing a current which passes through the locking solenoid of the same mechanism and the locking solenoid of the mechanism F in section V, which mechanism is located at the opposite side of the track two sections ahead. This current which passes through the locking solenoids attracts the locking pins of both mechanisms and causes the coöperating unlocking pins 34 in both sections to be released, whereupon the flexible contacts 46 of said mechanisms engage the contacts 45. The unlocking pins 34 when released are projected by the springs surrounding them and abut against the upstanding lugs 100 of the secondary or trip frames of both of said mechanisms, but this does not lock the main frame and the secondary or trip frames together.

During the final portion of the movement of the main frame 11 of the mechanism C in section III, which is the mechanism over which the locomotive is passing, the contact 52 forces the contact 55 into engagement with the flexible contact 56 while retaining the contact 54 in engagement with the contact 55. This energizes the unlocking solenoid 24 of mechanism A in section I, which is the mechanism on the same side of the track two sections in rear, thereby unlocking the main and secondary frames of said section and causing the unlocking pin of said solenoid to be attracted and withdrawn from the opening 43 in the secondary frame of said mechanism, and during its movement said pin automatically locks itself with the locking pin 35 of the locking solenoid of said section. This also automatically causes the flexible contact 46 to be disengaged from the contact 45 in said section. When the unlocking pin is withdrawn from the secondary frame, the track is opened to traffic, since the locomotive in section III has passed beyond the mechanism therein, and when a locomotive or train passes over the mechanism A in section I, the carrying frame will be depressed thereby without elevating the trip bar 66, as above explained with reference to the mechanism C in section III. If, however, a locomotive or train should, in passing through section I engage the depressor lever or pedal before the train in section III has actuated the mechanism C in said section, the action of the mechanism A in section I would be as follows:—

The train passing over said last-mentioned mechanism would cause the frame to swing and owing to the fact that the unlocking pin of this mechanism has not at this time been withdrawn from the secondary frame, said secondary frame would be caused to swing with the main frame and the trip bar 66 projected into the path of the lever 91 on the locomotive. This would cause the air valve 89 of the locomotive to be opened to permit the escape of the necessary quantity of air for setting the brakes. The locomotive or train would then be held against proceeding, and by reason of the provisions made, the engineer would be compelled to leave the cab of the locomotive and reset the air valve 89.

Reverting to the mechanism C in section III, attention is invited to the fact that when the main frame is returned to normal position by the spring 63 the unlocking pin of the unlocking solenoid carried by said main frame will be brought into alinement with the elongated opening 48 in the secondary frame, thereby locking said secondary frame to the main frame so that any train approaching from the rear and depressing the presser lever or pedal will cause the trip rod to rise and engage the lever of the air valve and thereby stop the train.

The electric current is provided for the lamps 101 at the time of locking the main frame to the secondary frame, owing to the fact that the unlocking pin when forced by its surrounded spring into the secondary or trip frame releases the flexible contact 46 and permits the same to engage the contact 45 on the insulation bar 44.

The arrangement of circuit wires shown in Figs. 12 and 13 is continued throughout the full length of the track, and assuming that the sections shown in these figures are the last five sections of that stretch of the track furnished with current by the storage battery 94 and that said stretch of track is continued to the left for a distance of fifty miles, at which point another storage battery is provided to furnish current to a similar stretch of track at the left of it; also assuming that each of the sections of this stretch of track is two miles long, I will now describe the operation of the invention in connection with the passage of current through the circuit wires as arranged.

Assuming there is a train traveling on that stretch of track shown in Figs. 12 and 13, and that the train is entering section III from the left, when the locomotive or train reaches the stop mechanism of said section, the right of way to proceed to the right is given and the signal lamp 101 at the right of said section or the semaphore, as the case may be, indicates a clear track ahead. The engineer therefore continues to travel through section III and when the actuator rod 71 engages the actuator or pedal 59 of stop mechanism C, contact 52 of said mechanism is caused to rise and engage the flexible contact 54. An electric circuit is thereby established which includes said contacts and the safety solenoid 23 of the same stop mechanism, the current passing from the positive pole of the storage battery through the positive feed wire 97 thence through wire 103 to the contact 52, from the latter to the contact 54, thence through wire 106 and safety solenoid 23, and finally through the wire 107 to the negative feed wire 95, which returns to the battery. This circuit is established during the initial portion of the swinging movement of the carrying frame, which does not impart this movement to the secondary or trip frame owing to the fact that the elongated slot 43 in said secondary or trip frame, into which the safety pin 27 is projected, provides the necessary play during the time that the safety pin is being retracted from said opening by the current passing through said safety solenoid and energizing the latter to attract said pin. This current is therefore a local current confined to the stop mechanism directly actuated by the train.

During the further swinging movement of the main frame 11, the contact 54 is forced against contact 55 while retained in engagement with contact 52; consequently electrical connection is established between contact 52 and 55 through contact 54 which energizes the locking solenoid 25 of the same mechanism and the locking solenoid of the stop mechanism F at the left of section V. This causes actuation of the locking pins of said locking solenoids and releases the unlocking pins 34 of the unlocking solenoids 24 in the stop mechanisms C and F. Said unlocking pins are consequently forced against the upstanding lugs 100 formed on the secondary or trip frames of these mechanisms, except in block V where the unlocking pins immediately lock the two frames together. When current is established by electrically connecting the contact 52 of stop mechanism C with contact 55, it passes from the battery through the positive feed wire 97 from the latter through wire 103 to contact 52, from the latter through contact 54 to contact 55, thence through wire 111 to the locking solenoid 25 of said stop mechanism C and thence through wire 107 to the positive feed wire. The current is also carried from contact 55 through wire 112 to the locking solenoid 25 of the stop mechanism F and from the latter through wires 110 and 107 to the negative feed wire 95. The actuation therefore of the locking solenoids 25 in stop mechanisms C and F releases the unlocking pins 34 of said mechanisms but does not immediately cause said pins to lock the main frames with the secondary or trip frames, owing to the fact that the ends of the pins abut against the upstanding lugs 100 and cannot enter the pin-receiving slots in the secondary or trip frames. The releasing of these unlocking pins also permits the flexible contacts 46 of said mechanisms to move into contact with the contacts 45, thereby establishing electric current through the signal lamps 101, or the lamps 133 in the semaphore, as the case may be. The circuit for each lamp when closed causes current to pass from the storage battery 94 through the positive feed wire 97, from the latter through wire 103 to wire 124, thence through the lamp 101, from the lamp through the wire 123 to contact 46 and contact 45, thence through wire 120 to the secondary negative feed wire 121, and from the latter to the negative feed wire 95 at a point adjacent the battery or directly through the negative pole of said battery, as may be desired. This causes the signal lamp at the stop mechanism C to be lighted.

When the contacts 45, 46 of mechanism C are brought into engagement, the contacts 45, 46 of stop mechanism F are also brought into engagement, the current being directed from the positive of the battery 94 through the positive feed wire 97, from the latter through the wire 103 in section V, from the wire 103 through contact 52 of mechanism E in section V, through wire 105 of said section to contact 52 in mechanism F, thence through wire 126 to the signal lamp 101 adjacent said mechanism F, thence through wire 125 to contact 46, from the latter to contact 45, thence through wires 127 and 120 and finally through the secondary negative feed wire 121 to the negative side of the battery 94. It is therefore clear that portions of other mechanisms are used to carry current through the mechanisms at the left of the track, but this may be otherwise arranged if desired.

The final movement of the main frame 11 causes the contact 52 of mechanism C to be connected with contact 56, through contacts 54 and 55 so as to energize the unlocking solenoid 24 in the mechanism H directly opposite in section III. An electric current is thereby established which includes said contacts and said unlocking solenoids, the current passing from the positive pole of the storage battery through the positive feed wire 97, thence through the wire 103 to contact 52 of mechanism C in section III, thence to contact 56 through the medium of contacts 54 and 55, thence through wire 115 to the unlocking solenoid 24 in mechanism A of section I, thence through said solenoid and through wires 116 and 107 to the positive feed wire 95. From the contact 56 in mechanism C of section III the current passes through the wire 117 to the unlocking solenoid 24 in the opposite mechanism H, section III, through which it passes and is thence directed through wires 118, 110 and 107 to the negative feed wire 95.

It will be clear therefore that owing to the gradual rise or incline of the upper face of the presser lever or pedal 59, which is engaged by the roller 77 on the actuating rod of the locomotive, the thrust or presser bar 61 is gradually lowered, first to bring contact 52 into engagement with contact 54, thence contact 55 in connection with contact 52 through contact 54, and finally contact 56 in electrical connection with contact 52, through contacts 54 and 55. This of course is a continuous action and will occur in a fraction of a second. After the roller rides off the presser lever or pedal 59 the spring 63 returns the main frame of mechanism C to normal position with the result that all electrical connections are broken except those established by the contacts 45, 46 of mechanism C in section III and mechanism F in section V.

The signal lamps 101, or the lamps 133 of the semaphore, therefore remain lighted, and as the unlocking pin of the unlocking magnets 24 of both these mechanisms have been released from the locking pins 35 of said mechanisms they will enter the notches 43 at the right hand or long end of the secondary or trip frame, consequently if another train following the train which has passed mechanism C should pass over said mechanism, the carrying frame would be depressed by the actuating rod of the locomotive and cause both the main and secondary or trip frames to be swung from the position shown in full lines in Fig. 4 to that shown in dotted lines, and as the trip or stop bar 66 is attached to the secondary or trip frame, said bar would be elevated so that the lever 91 of the second train would be engaged by said trip arm and release a quantity of air in the air brake system to set the brakes on the train.

In Fig. 14 I have shown a siding 158 connected to the main track, this siding having a rail c at the right and a rail d at the left. The rail c of the siding and the rail 1 of the main track are provided with the usual switches 159 at each end of the siding, the switches of the siding being adapted to be swung against the rail 2 of the main track or away from the same, and the switches of the rail, being adapted to be swung against the siding or away from the same so as to open or close the siding from either end. As shown in Fig. 14, the switches of the rail c are swung away from the rail 2 of the main track so that the main track is opened for through traffic. By means of any suitable switch-operating mechanism, the switches 159 may be actuated to direct a train into the siding or to permit it to pass along the main track, as may be desired.

The track-switch operating-mechanisms are shown at opposite ends of the siding at 160 and each includes a longitudinally-movable rod 161 arranged transversely with respect to the main track. These rods 161 have connection with the switches 159 and enter casings 162 of a circuit controller arranged adjacent the rail 2 of the main track at opposite ends of the siding. One of these casings and the parts inclosed thereby are shown in Figs. 16 and 17, and I deem it sufficient to describe the construction and operation of one, since both are exactly alike. The end of the rod entered into the casing is pivotally connected to a lever 163, said lever being pivotally connected to one of the walls of the casing, as at 164, the pivot being preferably nearer one end of the lever than the other so as to provide a long and short arm.

Near the outer end of the long arm a contact 165 is secured and at the end of said long arm a contact 166 is secured. Secured to opposite sides of the casing 162 are two pairs of contacts 167, 168, the members of each pair being preferably flexible and spaced apart. The contact 165 is adapted to be brought into engagement with the pair of contacts 167 and establish electrical connection between the two, while the contact 166 is adapted to be brought into engagement with the pair of contacts 168 for a like purpose, but such engagement is made only during the movement of the lever 163, as will appear hereinafter.

Near each end of the siding, a circuit-breaker 169 is arranged, each mechanism, as shown in Figs. 18 and 19 comprising a casing 170 having a cover 171, to the underside of which a snap switch 172 is secured. This snap switch has a central contact 173 arranged within a body of insulating material 176. Said central contact has a rotatable spindle 175, and secured to the free end of said spindle is a ratchet wheel 174. Oppositely arranged contact arms 177, 178 are secured to said spindle and therefore rotate with the latter so that by reason of said spindle forming part of the central contact 173, the arms 177, 178 are at all times in electrical connection with the positive feed wire. Secured to the body 174 are two contacts 179, 180. These are arranged at an angle of 90 degrees to each other and are adapted to be engaged by the contact arms 177, 178 upon rotation of the spindle 175.

In the position shown in Fig. 18, the oppositely-disposed arms are positioned in a vertical plane with the arm 178 in engagement with the contact 180. Now upon rotation of the ratchet wheel, which is provided with four teeth, the spindle 175 is caused to rotate through a quarter of a revolution at each actuation, thus bringing said arms into a horizontal plane with the contact 178 in engagement with contact 179. A further quarter revolution of the spindle will bring the contact 177 into engagement with contact 180, this being continued during the operation of the switch so that the contact arms 177, 178 are brought into engagement with the contacts 180, 179 in succession.

Depending from the cover 171 is a hanger 181 in which is mounted a rock-shaft 194, and secured to this rock-shaft is a ratchet actuating lever 182, said lever having its pivotal point nearer one end than the other so that a long and short arm is provided for the same, thus assuring the required extent of movement to operate the switch by imparting a comparatively short movement to the prime mover of the circuit breaker. To the outer end of said long arm a spring-retained dog 183 is secured, said dog being slidable in a pair of brackets 184 secured to said lever, said dog having a collar 185 secured thereto, and surrounding the dog is a spiral spring 186 which bears at one end against said collar and at its other end against one of said brackets, thus holding the actuating end of said dog in operative position with respect to said ratchet wheel.

A retractile spring 187 is secured at one end to the long arm of said lever and at its other end to a hanger 188 depending from the cover 171 and extending to a point beneath the lever, at which point said spring is attached thereto. Mounted on the cover 171 is an arm or standard 189 to which is pivotally secured an actuator or prime mover in the form of a depressor lever or pedal 190 adapted to be engaged by the roller 77 of the actuating rod 71 secured to the locomotive or train passing over the siding.

Between the ends of this depressor lever or pedal a push or thrust rod 191 is pivotally secured, said rod being guided for vertical movement in the cover 171 and extending into the casing 170 in contact with the short arm of the ratchet-actuating lever 182. A retractile spring 192 is secured at one end to said cover and at its other end to a lug 193 extending laterally from said push or thrust rod, thus holding said rod elevated and the depressor lever or pedal in position so that it will be engaged by the roller of the actuating rod of a locomotive or train traveling over the siding.

The rock-shaft 194 is also journaled in one of the side walls of the casing 170 and extends into a casing 195 arranged directly opposite the casing 170, adjacent the track $d$ of the siding. This casing has a cover 196 from which depends a hanger 197 in which shaft 194 is journaled. Secured to the shaft 194 at a point within said casing 195 is a laterally-extending arm 198 against which bears a push or thrust rod 199 guided for vertical movement in the cover 196.

Rising from the cover is an arm or standard 200 to which is pivotally secured one end of an actuator or prime mover in the form of a depressor lever or pedal 201, said pedal having pivotal connection at a point between its ends with the push or thrust rod 199, as at 202. This push rod is also provided within the casing with a laterally extending lug 203 and a retractile spring 204 having one end secured to said lug and its other end secured to the cover 196 and acting to hold the push or thrust rod 199 elevated so that the actuator rod of a train passing beyond the siding in the direction of the arrow 205, Fig. 14, will actuate the depressor lever or pedal, the movement of which is imparted to the circuit breaker 169 directly opposite, through the medium of the shaft 194. The mechanism within the casing 195 may therefore be termed "movement imparting mechanism", and one of said movement imparting mechanisms is arranged opposite each of the circuit breakers 169. The contacts of the circuit breakers 169 and of the mechanisms within the circuit controlling casings 162 are shown in connection with circuit wires in diagrammatic form in Fig. 15, and these circuit wires will now be described with reference to said figure.

Contact 165 on the lever 163 of the circuit controller at the left of Fig. 15 has a circuit wire 206 secured thereto which leads to the central contact 173 of the snap switch 172 at the right hand end of the siding, and in this figure the contact arms of the snap switch 172 are shown connecting contact 173 with contact 180. From contact 180 a circuit wire 207 leads to contact 179 of the snap switch 172 in the circuit breaker at the left hand end of the siding, the circuit being broken at this point. From the central contact 173 of the snap switch in the last-mentioned mechanism a circuit wire 208 leads to the positive feed wire 97, and the contact 178 connects contact 173 with contact 180, from which point a circuit wire 209 is directed to contact 179 of the snap switch in the circuit breaker at the right hand end of the siding. The contact 166 of the lever 163, forming part of the circuit controller at the left hand end of the siding has a circuit wire 210 connected thereto which leads to the positive feed wire 97, as at 211.

Each of the members of the pair of contacts 167 has a circuit wire 212 connected thereto, these wires being continued to similar contacts 167 in the circuit controller at the right hand end of the siding, and connecting wires 212 with the circuit wires 115 are wires 213. Two wires 214 connect the members of the other pair of contacts 168 of the circuit controller at the left hand end of the siding with similar contact members of the circuit controller at the right hand end of the siding and these wires have wires 215 connected thereto which lead to the wires 112.

From the contact 165 of the lever 163 forming part of the circuit controller at the right hand end of the siding, a circuit wire 216 is directed to the central contact 173 of the snap switch in the circuit breaker at the right hand end of the siding and from the contact 166 of said lever a wire 217 leads to the positive feed wire 97. When, therefore, a train is to be side-tracked to permit another to pass on the main track, the track-switch at one or the other end of the siding is actuated.

Assuming a train traveling to the right is to enter the siding from the left, the switch-operating mechanism 160 at the left hand end of the siding is actuated. This causes the lever 163 of the corresponding circuit controller to be swung on its pivot, moving contact 165 of said lever into engagement with the pair of contacts 167 and beyond the same, and the contact 166 of said lever into engagement with the pair of contacts 168 and beyond the same. During this movement, however, no circuit is established when the contact 165 passes in contact with the pair of contacts 167, due to the fact that the circuit including the wire 206 leading from contact 165 is broken between contacts 179 and 173 of the snap-switch in the corresponding circuit breaker at the left hand end of the siding, as clearly shown in Fig. 15. The contact 166, however, of said lever establishes an electric current in the circuit including the wires 214 and 215, in which circuit the wires 112 are included and the locking solenoids 25 of the stop mechanisms B, C in sections II, III, respectively, and the locking solenoids 25 in stop mechanisms G, F, in sections IV and V, respectively; thus releasing the locking pins 35 of the locking solenoids 25 of said mechanisms; assuming of course that the siding is placed between sections III and IV; or within either section III or IV between the stop mechanisms thereof. If, however, an approaching train intending to travel along the main track has passed the mechanism C in section III, and the track-switch is closed to siding, the locking pins in stop mechanisms B and C and F and G will have been released owing to the fact that the locking solenoids of which said pins form part had been energized by the train on the main track. When therefore the track switch is closed to the siding the actuation of the stop-mechanism in the adjoining sections at either end of the siding, takes place in regular order, as hereinbefore described.

When the train to be side-tracked enters the siding from the left, as described, and the actuating rod 71 of the locomotive or train comes in contact with the presser lever or pedal 190 of the circuit breaker at the left hand end of the siding, the ratchet actuating lever 182 will be swung to cause rotation of the ratchet wheel 174 and will compel the contact arm 178 to move out of engagement with the contact 180 and into engagement with contact 179. After this has taken place the track switch-operating mechanism is again actuated so as to close the track switch at the left hand end of the siding, which causes the lever 163 of the circuit controller at said end to swing on its pivot, returning said lever from the position shown in dotted lines in Fig. 16 to that shown in full lines. The contact 166 of said lever passes in contact with the pair of contacts 168 during the initial portion of its return movement, thus establishing a current, as previously described, through the locking solenoids of mechanisms B, C in sections II, III, and G, F in sections IV, V, which cause the locking pins 35 of said solenoids to be actuated, but at such times the actuation of said locking pins has no effect on other parts of the mechanisms, since the unlocking pins associated therewith had been previously released and are now positioned to lock the main and secondary or trip frames together. During the further return movement of the lever 163 the contact 165 on said lever passes in contact with the pair of contacts 167 and establishes a circuit in which are included the wire 208 connected to the positive feed wire, central contacts 173 of the circuit breaker at the left hand end of the siding, the contact arm 178 and contact 179 of said circuit breaker, thence through wire 207 to the snap-switch of the circuit breaker at the right hand end of the siding, and from the central contact of said snap-switch to and through wire 206 which is connected to the contact 165 of the swinging lever 163. The current is carried from said contact through wires 212 which are connected to the pair of contacts 167, and from said wires 212 through wires 213 and 115 which lead to the unlocking solenoids of stop mechanisms B and C in sections II, III, and G, F in sections IV, V, thereby energizing said solenoids and causing the unlocking pins to be retracted so as to unlock the secondary or trip frames from the main frames of said stop mechanisms, thereby showing a clear road along the main track.

When the train passing along the main track has passed the siding, the track-switch may be opened at either end so that the train will back onto the main track from the left hand end, or proceed along the siding and move onto the main track from the right hand end. Assuming the train is to be backed onto the main track, the track-switch members 159 at the left hand end of the siding are moved to open position, which again moves the lever 163 of the circuit controller at said end from the position shown in full lines to that shown in dotted lines in Fig. 14, thus again actuating the several parts of the apparatus as described when opening the track-switch members to permit the train to enter the siding and setting the stop mechanisms B, C in sections II, III, and the stop mechanisms G, F in sections IV, V against the movement of trains from the left or right into said sections. Assuming the train on the siding is to leave the siding at the right hand end, the actuating rod of the locomotive of said train comes in contact with the presser lever or pedal 190 of the circuit breaker 169 at the right hand end of the siding, thereby depressing the pressure lever or pedal 190 of said circuit breaker so as to actuate the ratchet actuating lever 182 and compel the ratchet wheel 174 to rotate and move the contact arm 177 or 178, as the case may be, out of engagement with contact 180 and into engagement with contact 179.

It is of course understood that the track-switch members 159 at the right hand end will have to be swung into open position, which may be done before the train on the siding is moved or after it has passed the circuit breaker at the right hand end of the track. In either case the lever 163 of the circuit controller at the right hand end of the siding is actuated.

In the event of the track-switch members being actuated before the train on the siding reaches the circuit breaker at the right hand end of the track, a circuit is established through the locking solenoids of stop mechanisms B, C in sections II, III, and G, F in sections IV, V, during the initial movement of levers 163 from the position shown in full lines in Fig. 16 to that shown in dotted lines, the circuit being from the positive feed wire through wire 208 to the snap switch in the circuit breaker at the left hand end of the siding; thence through wire 207; thence through the snap switch of the circuit controller at the right hand end of the siding; thence through wire 216; contact 165; contacts 167, and from the latter through wires 212, 213 and 115 to the unlocking solenoids, thus momentarily unlocking the secondary or trip frames of said stop mechanisms from the main frames, but this action is immediately counteracted during the final portion of the movement of lever 163 at which time the contact 166 of said lever passes in contact with the pair of contacts 168 and energizes the locking solenoids of said mechanisms so as to immediately release the unlocking pins and cause them to again lock the secondary or trip frames of said mechanisms to the main frames.

The circuit established by contact 166 and contacts 168 is through wire 210 from the positive feed wire; from wire 210 through contact 166; thence through contacts 168 to wires 214, and from the latter through wires 215 and 112 to the locking solenoids so that the frames of said stop mechanisms are locked together, and any locomotive or train passing into section II and traveling in the same direction, or any locomotive or train entering section V and traveling in the opposite direction will be stopped when the actuating rod of the locomotive comes in contact with the stop mechanisms in said sections, due to the fact that when the secondary or trip frame is locked to the main frame, the actuation of the presser lever or pedal will cause the stop or trip frame of said mechanism to be elevated so that the air brake system is relieved of air pressure and causes braking of the locomotive or train.

When the track-switch members 159 at the right hand end of the siding are opened to permit the train to pass out of the siding at said end, after the train has passed the circuit breaker at the right hand end of said siding, the actuation of the stop mechanisms B, C in sections II, III, and G, F in sections IV, V is similar to that last described, except that no circuit is established when the contact 165 is moved into contact with the pair of contacts 167. This is due to the fact that the circuit is broken in the snap switch of the circuit breaker at the right hand end of the track, there being no electrical connection between wires 216 and 207 forming part of said circuit.

When the train enters the siding from the right and travels in the direction of the arrow 205, Fig. 14, the electrical circuits are established in the same manner as when the train enters the siding from the left, but as the actuating mechanism on the locomotive adapted to be brought into action during the final movement of the latter is at the right of the same, the presser levers or pedals 201 of the movement imparting mechanisms 195 are actuated and these mechanisms impart motion to the circuit breaker directly opposite.

It is of course understood that my invention may be applied to double track railways as well as to those having single tracks, in which event provision is made for controlling the movement of trains traveling in the same direction, and in such cases stop mechanisms are provided only at the right of each track, since there are no trains intended for travel on the same track in an opposite direction.

In order to regulate the speed of a train along a curved portion of a track, I provide a circuit controller 217 and stop mechanism 218 similar to the stop mechanism above described, with the exception that the safety solenoid and its electrical connections are omitted. The circuit controller is shown in Figs. 24 and 25 and comprises a casing 219 having a cover 220. Rising from the cover is an arm or standard 221 to which one end of an actuator in the form of a presser lever or pedal 222 is pivotally secured, said lever or pedal being pivotally connected to the upper end of a push or thrust rod 223 which is guided for movement in the cover and extends into the casing 219. Said rod has a stop pin 224 thereon adapted to limit the upward movement thereof, and in order to hold said push or thrust rod with its attached presser lever or pedal in its uppermost position, I provide the same with a laterally extending lug 225 having one end of a retractile spring 226 secured thereto, the other end of said spring being attached to the cover, as at 227.

The lower end of the push or thrust rod 223 engages a lever 228 pivotally connected to a hanger 229 depending from the cover, the point of pivotal connection being nearer one end than the other to provide a short arm and a long arm for said lever, so that a comparatively short movement imparted thereto may be increased at its actuating end. At the end of the long arm of said lever a gear segment 230 is provided which is in mesh with a gear wheel 231 forming part of an ordinary clock movement 232, which I deem it unnecessary to illustrate or describe in detail. The mechanism, however, may be said to have the usual spring and escapement so that when wound up it will require a definite length of time to run down.

Arranged within the casing is a flexible contact 233, and a second flexible contact 234 is spaced a distance from contact 233. The actuating end of the lever 228 has a contact 235 secured thereto which is normally out of contact with the flexible contacts 233, 234 and is adapted to first engage contact 233 and then engage contact 234 during the upward movement of said lever and after a predetermined period of time it is adapted to again engage contact 233 during the return or downward movement of said lever. This actuation is caused by the movement of the lever 228 from the position shown in full lines in Fig. 24 to that shown in dotted lines, and during the return movement from the position shown in dotted lines to that shown in full lines.

When a train passing along a curved portion of a track engages the depressor lever with the roller 77 at the lower end of its actuating rod 71, lever 228 is swung from the position shown in full lines to that shown in dotted lines in Fig. 24, thereby causing the gear wheel 231 to rotate and wind up the spring of the clock mechanism. During this upward movement the contact 235 has engaged contact 233 and contact 234.

After the train passes in contact with the presser lever or pedal, the spring 226 immediately elevates the push or thrust rod 223 and the presser lever or pedal 222 attached thereto. For the purpose of returning the lever 228 to normal position a retractile spring 236 is provided, said spring having one end thereof attached to said lever and its other end attached to the lower end of a depending hanger 237 secured to the cover 220. This return movement, however, is controlled by the escapement of the clock mechanism, and assuming the distance between the circuit controller 217 and the stop mechanism 218 to be one mile, the clock mechanism may be so geared, in a manner common to those experienced in the science of horology, that it will require two minutes to return the lever to normal position.

To acquire a better understanding of the operation of the circuit controller and stop mechanism associated therewith, I will describe the circuit wires connecting said controller with said mechanism.

Reference being had to Fig. 23, a wire 238 connects contact 234 with the locking solenoid 25 of the stop mechanism 218, said solenoid having connection by wire 239 with the negative feed wire 95. Contact 233 has a wire 240 attached thereto which leads to the unlocking solenoid 24 of said stop mechanism, said solenoid having connection by means of a wire 241 with the wire 239 leading to the negative feed wire. Contact 235 has a wire 242 connected thereto which leads to the positive feed wire 97.

When therefore the lever 228 is actuated, it brings contact 235 into engagement with contact 233 causing a current to be established through the unlocking solenoid, whereupon the two frames of the mechanism are unlocked and the pin of said solenoid retained in unlocked position by the locking pin of the locking solenoid, as explained with reference to the stop mechanisms shown in the preceding figures. When the contact 235 is brought into engagement with contact 234 a circuit is established through the locking solenoid, thus causing the unlocking pin to be released, and by means of the spring surrounding said unlocking pin compel it to move and lock the secondary frame to the main frame of the mechanism. This condition of the locking mechanism is maintained for a predetermined space of time, or until the contact 235 in its return movement, governed by the clock mechanism, again engages contact 233. If the train reaches the stop mechanism 218 before contact 235 engages contact 233, the lock mechanism will be actuated by the train, and by reason of the secondary frame being connected to the main frame, the stop or trip bar 66 of said mechanism will be elevated when the actuating rod of the locomotive engages the presser lever or pedal of said stop mechanism; consequently the valve 89 on the locomotive will be opened by the lever thereof coming in contact with said stop or trip bar and the air released from the brake system will cause the brakes to be applied to the wheels of the train, thus stopping the train and preventing further movement until the time, controlled by the clock movement, has passed and the contact 235 is brought into engagement with contact 233, which again energizes the unlocking magnet and withdraws the unlocking pin from the secondary frame.

It is of course understood that the arrangement of wiring of various parts of my apparatus may be departed from and the desired results otherwise obtained. I do not wish therefore to confine myself to the exact arrangement of wires or their connections. It is also apparent that changes in construction and arrangement of parts may be resorted to without departing from my invention or sacrificing any of the advantages thereof.

Having thus described my invention, what I claim is—

1. Means for controlling the movements of trains comprising stop devices arranged in two series along opposite rails of a track, each controlling device comprising two swinging frames, an actuator adapted to be engaged by a part of a train secured to one of said frames, a stop or trip member secured to the other swinging frame, a safety solenoid, a locking solenoid, and an unlocking solenoid mounted on one of said frames, each having pins movable therein, the pins of said safety and unlocking solenoids being adapted to connect said swinging frames together and permit of disconnecting the same, the pin of said locking solenoid serving to hold the frames in unlocking position, switches for each stop device having fixed contacts and a movable contact carried by one of said swinging frames, said movable contact when said last-mentioned frame is actuated being adapted to establish an electrical current through said solenoids, an electrical connection between the locking and unlocking solenoids of each stop device with the locking and unlocking solenoids of the two adjacent stop devices ahead at the opposite side of the track and the two adjacent stop devices in rear at the same side of the track.

2. Means for controlling the movements of trains over a curved portion of a track, comprising a circuit controller having an actuator adapted to be engaged by a part of a train to move the same in one direction, time-controlled mechanism regulating the return movement of said actuator, a switch controlled by said actuator, a stop mechanism at a distant point having a stop or trip member, an actuator adapted to be engaged by a part of the train, electrical means for connecting said last-mentioned actuator with said stop or trip member, and electrical connection between said electrical means and the switch in said circuit controller.

3. Means for controlling the movements of trains over a curved portion of a track comprising a circuit controller having an actuator adapted to be engaged by a part of a train to move the same in one direction, time-controlled mechanism regulating the return movement of said actuator, a pair of switches with which the actuator coöperates to make and break electrical current, a stop mechanism at a distant point having two swinging members, an actuator secured to one of said swinging members and adapted to be engaged by a part of the train, a stop or trip member secured to the other swinging member, an unlocking solenoid and a locking solenoid carried by one of said members, each solenoid having a central pin movable therein, a spring surrounding the pin of said unlocking solenoid to force the same in one direction in contact with the other frame or through the same, a spring surounding the pin of said locking solenoid to engage the pin of said unlocking solenoid and hold the latter in retracted position, electrical connection between the locking solenoid and one of the pair of contacts of said circuit controller, and electrical connection between the unlocking solenoid and the other contact of said circuit controller.

4. Means for controlling the movements of trains, comprising a series of spaced devices arranged along a track, each device comprising two relatively movable elements, an actuator secured to one of said elements, a trip or stop element secured to the other movable element, a solenoid for locking said movable elements together, a solenoid for retaining said movable elements in unlocked relation, a single contact connected to corresponding movable elements of the several controlling devices, a pair of contacts for each device adapted to be engaged by the single contact of each device, and electrical connections between each set of contacts and the solenoids of a device in rear.

5. Means for controlling the movement of trains, comprising spaced devices arranged along the track to be actuated by a locomotive or train passing over the track, actuating mechanism carried by the locomotive or train for actuating said devices, means on the locomotive or train for causing the brakes thereof to be set, each device along the track having means to engage the brake-actuating means of the locomotive or train, and means to hold the actuating mechanism on the locomotive or train in inoperative position.

6. A train controlling apparatus, comprising two spaced stop devices arranged along a track, each device comprising two relatively movable members, a safety device for connecting said members together, an unlocking device serving also to connect said members together, and a locking device adapted to retain said unlocking device in unlocked position, the safety device of each stop device being actuated to disconnect the relatively movable members from each other upon actuation of said stop device, operative connection between said stop device and the unlocking device of a distant stop device spaced therefrom in one direction, and operative connection between each stop device and the locking device spaced therefrom in another direction.

7. Train controlling means, comprising spaced train actuated devices arranged in two series along the rails of a track, one series being actuated by trains traveling in one direction and the other by those traveling in an opposite direction, each device comprising two relatively movable members, an actuator connected to one of said members to be engaged by a part of a locomotive or train, a trip or stop member connected to the other movable member to engage brake applying means on the locomotive or train, a safety solenoid, a locking solenoid and an unlocking solenoid carried by said first-mentioned member, said safety and unlocking solenoids being adapted to connect said relatively movable members together, said train actuating devices being electrically connected together in groups, each device forming part of a plurality of groups and being so connected with other devices of a group that when actuated by a locomotive or train it will cause disconnection of the relatively movable members of a device in rear of the same series and of the members of the device directly opposite of the other series and also cause connection of the relatively movable members of a device ahead of the opposite series.

8. In a train controlling apparatus, a train-actuated device comprising two swinging members having their pivots coincident, an actuator for one of said members, a stop or trip device for the other member, an unlocking solenoid adapted to connect said members to cause them to swing together, a locking solenoid adapted to hold said unlocking solenoid in unlocking position, a visible signal coöperating with said solenoids and operatively connected so that when said swinging members are disconnected said signaling member indicates a clear track ahead and when said swinging members are connected said signaling member indicates a train ahead.

9. Means for controlling the movements of trains comprising spaced devices arranged along a track and adapted to be actuated by a locomotive or train traveling on the track, said devices being electrically connected and arranged so that when one is actuated by a locomotive or train another will be set so as to apply the brakes of a locomotive or train when actuated by the latter, and means for setting the devices to cause the setting of the brakes of a locomotive or train when the circuit in said electrical connections between said devices becomes broken.

10. Means for controlling train movements, comprising spaced devices arranged along the track adapted to be actuated by a train traveling on the track, each device having a stop element adapted under certain conditions to actuate the air brake system of a train to stop the same, electrical means embodied in each of said devices to control the operativeness of its stop element, electrical connection between said devices for controlling the stop element of a distant device in accordance with that of the actuated device, and safety means in said devices for causing actuation of the stop elements of all devices when the source of electrical power fails.

11. Means for controlling train movements, comprising spaced devices arranged along the track adapted to be actuated by a train or trains traveling on the track, each device having a stop element adapted under certain conditions to actuate the air brake system of a train to stop the same, electrical means embodied in each device to control the operativeness of its stop element, electrical connections between said devices for controlling the stop element of a distant device in accordance with that of the actuated device, and safety means in each device for controlling the operativeness of its stop element when the current to any part or parts of said device fails.

In testimony whereof I affix my signature.

JULES SPIESS.